United States Patent
Otsuka

(10) Patent No.: US 8,029,057 B2
(45) Date of Patent: Oct. 4, 2011

(54) CLUTCH MECHANISM FOR VEHICLE SEAT

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 145 days.

(21) Appl. No.: 12/622,656

(22) Filed: Nov. 20, 2009

(65) Prior Publication Data

US 2010/0140989 A1    Jun. 10, 2010

(30) Foreign Application Priority Data

Dec. 10, 2008 (JP) ................................. 2008-314392

(51) Int. Cl.
*B60N 2/42* (2006.01)
*B60N 2/427* (2006.01)
*B60N 2/48* (2006.01)

(52) U.S. Cl. .................................................. 297/216.12

(58) Field of Classification Search .............. 297/216.12
See application file for complete search history.

(56) References Cited

U.S. PATENT DOCUMENTS

| | | | |
|---|---|---|---|
| 7,484,798 B2 * | 2/2009 | Yamaguchi | 297/216.12 |
| 7,673,938 B2 * | 3/2010 | Yamaguchi et al. | 297/216.12 |
| 2006/0006709 A1 * | 1/2006 | Uno et al. | 297/216.12 |
| 2008/0129093 A1 * | 6/2008 | Kim | 297/216.12 |
| 2009/0126520 A1 | 5/2009 | Yamaguchi et al. | |
| 2009/0167066 A1 * | 7/2009 | Mori et al. | 297/216.12 |
| 2009/0250981 A1 * | 10/2009 | Matsui | 297/216.12 |
| 2009/0267389 A1 * | 10/2009 | Otsuka | 297/216.12 |
| 2009/0309398 A1 * | 12/2009 | Niitsuma et al. | 297/216.12 |
| 2010/0007183 A1 * | 1/2010 | Akutsu | 297/216.12 |
| 2010/0060048 A1 * | 3/2010 | Otsuka | 297/216.12 |
| 2010/0060049 A1 * | 3/2010 | Otsuka | 297/216.12 |
| 2010/0140988 A1 * | 6/2010 | Otsuka | 297/216.12 |
| 2010/0148545 A1 * | 6/2010 | Omori | 297/216.12 |
| 2010/0187874 A1 * | 7/2010 | Matsui | 297/216.12 |
| 2010/0187875 A1 * | 7/2010 | Sasaki et al. | 297/216.12 |
| 2010/0270834 A1 * | 10/2010 | Niitsuma | 297/216.12 |
| 2010/0270835 A1 * | 10/2010 | Nitsuma | 297/216.12 |
| 2010/0295348 A1 * | 11/2010 | Takayasu et al. | 297/216.12 |
| 2011/0012401 A1 * | 1/2011 | Omori | 297/216.12 |
| 2011/0018317 A1 * | 1/2011 | Omori | 297/216.12 |
| 2011/0074191 A1 * | 3/2011 | Omori | 297/216.12 |

FOREIGN PATENT DOCUMENTS

JP    2005-95237    4/2005

OTHER PUBLICATIONS

English language Abstract of JP 2005-95237, Apr. 14, 2005.

* cited by examiner

*Primary Examiner* — Rodney B. White
(74) *Attorney, Agent, or Firm* — Greenblum & Bernstein, P.L.C.

(57) ABSTRACT

A coupling arm presses a first or second arm of a swing member, connected to a frame of a seat back, by an occupant's backrest load caused by a rear-end collision of a vehicle to pivotally move the swing member. The first arm receives a first backrest load via the coupling arm and the second arm receives a second backrest load, which is larger than the first backrest load, via the coupling arm. The first and second arms are set so that a maximum pivot amount of the swing member when the first arm is pressed to pivot is equal to a maximum pivot amount of the swing member when the second arm is pressed to pivot.

6 Claims, 9 Drawing Sheets

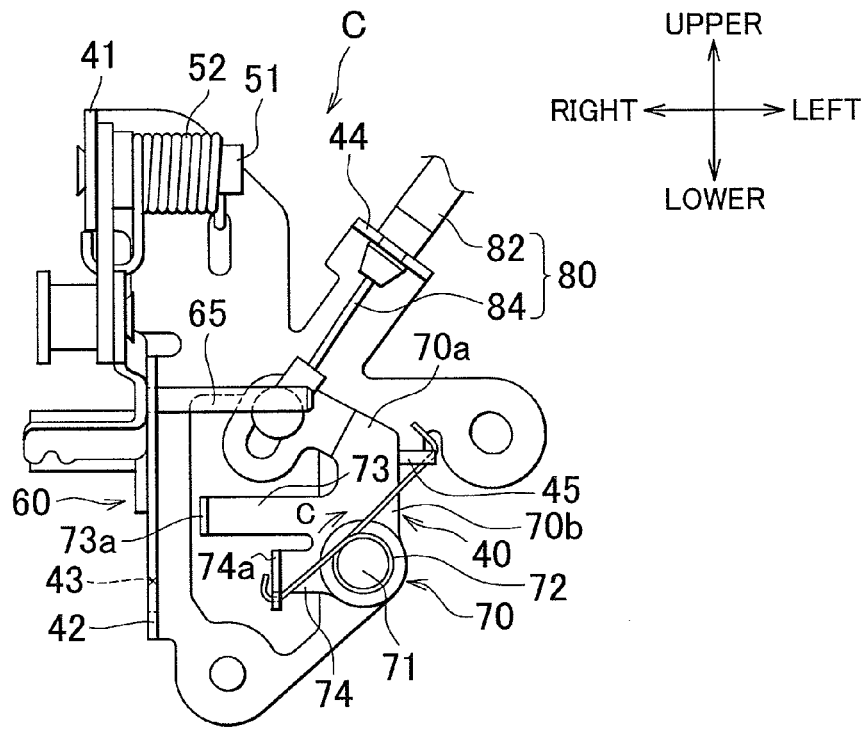
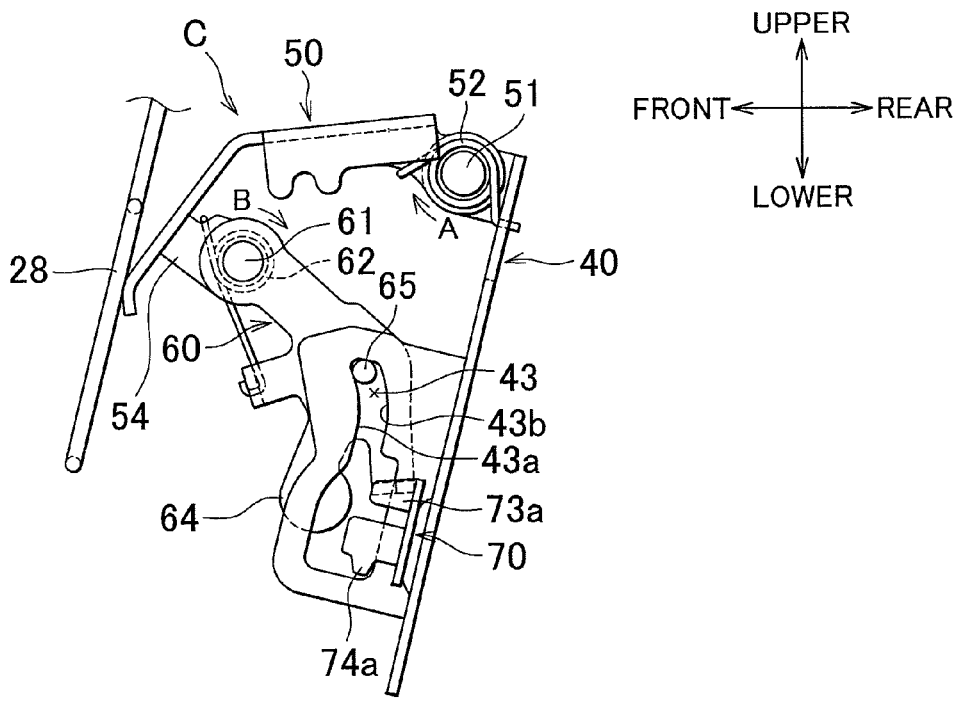

CLUTCH MECHANISM FOR VEHICLE SEAT

INCORPORATION BY REFERENCE

The disclosure of Japanese Patent Application No. 2008-314392 filed on Dec. 10, 2008 including the specification, drawings and abstract is incorporated herein by reference in its entirety.

BACKGROUND OF THE INVENTION

1. Field of the Invention

The invention relates to a clutch mechanism for a vehicle seat and, more particularly, to a clutch mechanism for a vehicle seat, which transmits an occupant's backrest load caused by a rear-end collision of a vehicle.

2. Description of the Related Art

In an existing art, there has been known a headrest for a vehicle seat, of which a portion (support plate) that supports the back of an occupant's head instantaneously pops up toward the back of the occupant's head in the event of a rear-end collision of a vehicle. Here, Japanese Patent Application Publication No. 2005-95237 (JP-A-2005-95237) describes a technique in which the support portion pops up as described above as a load of an occupant seated on a vehicle seat strongly presses a seat back because of momentum in the event of a rear-end collision of a vehicle. In this technique, unless a rear-end collision occurs in the vehicle, an acceleration detecting mechanism installed inside the seat back does not transmit an occupant's backrest load. Therefore, even when the occupant strongly presses the seat back during normal times when no rear-end collision has been occurring in the vehicle, it is possible to prevent the support plate from erroneously popping up.

However, in the above described existing technique, when the occupant is heavy, a mere backrest load of the occupant causes a detection arm to swing by a large amount. On the other hand, when the occupant is light, a load of the occupant pressing the seat back is small even when a rear-end collision occurs in the vehicle, causing the detection arm to swing by a small amount. The support plate pops up when the detection arm swings by a certain amount or more. Therefore, depending on the degree of swing of the detection arm, the acceleration detecting mechanism may not smoothly operate even when a rear-end collision occurs in the vehicle. This may cause a malfunction in popping up of the support plate.

SUMMARY OF THE INVENTION

The invention is made in order to solve the above-described problem, and provides a clutch mechanism for a vehicle seat, which reliably transmits an occupant's backrest load caused by a rear-end collision of a vehicle even when there is a physique difference among occupants.

A first aspect of the invention provides a clutch mechanism for a vehicle seat. The clutch mechanism includes a pressure receiving member that is pivotably connected to a frame of a seat back; a coupling arm that is pivotably connected to the pressure receiving member; a swing member that is pivotably connected to the frame of the seat back and that is pressed by the coupling arm to pivot. The coupling arm is provided with a weight and receives an occupant's backrest load via the pressure receiving member, and the occupant's backrest load received and inertia force applied to the weight in the event of a rear-end collision of the vehicle cause the coupling arm to move in the event of a rear-end collision of a vehicle. The swing member has a first arm receiving a first backrest load via the coupling arm and a second arm receiving a second backrest load, which is larger than the first backrest load, via the coupling arm. The first and second arms are set so that a maximum pivot amount of the swing member when the first arm is pressed to pivot is equal to a maximum pivot amount of the swing member when the second arm is pressed to pivot. With the above configuration, even when a light occupant is seated on the vehicle seat or even when a heavy occupant is seated on the vehicle seat, the pivot amount of the swing member when an occupant's backrest load is transmitted to the swing member is constant. That is, even when the first arm is pressed or even when the second arm is pressed, the pivot amount of the swing member is constant. Therefore, when the tension is, for example, applied to the operation cable by an occupant's backrest load caused by a rear-end collision of the vehicle, it is possible to prevent an excessive magnitude of tension from being applied to the operation cable even when the occupant's backrest load is heavy.

In addition, the clutch mechanism for a vehicle seat according to the first aspect may further include a lock mechanism that is provided for the seat back and that is connected to the swing member via a transmitting member. The lock mechanism may be released as the swing member pivots. With the above configuration, the lock mechanism is released via the transmitting member by a backrest load transmitted to the swing member. That is, the pivot of the swing member is utilized to release the lock mechanism.

Furthermore, in the above aspect, an active headrest that is assembled to the seat back and that has a support plate that pops up toward the back of a head of the occupant may be provided. The support plate may pop up toward the back of the head of the occupant as the lock mechanism is released. With the above configuration, it is possible to cause the support plate to pop up toward the back of the head of an occupant by an occupant's backrest load caused by a rear-end collision of the vehicle. Thus, as a rear-end collision occurs in the vehicle, it is possible to instantaneously receive the back of the head of the occupant by the support plate.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a front schematic view of FIG. 2;

FIG. 4 is a side schematic view of FIG. 2;

DETAILED DESCRIPTION OF EMBODIMENTS

Figure 1:
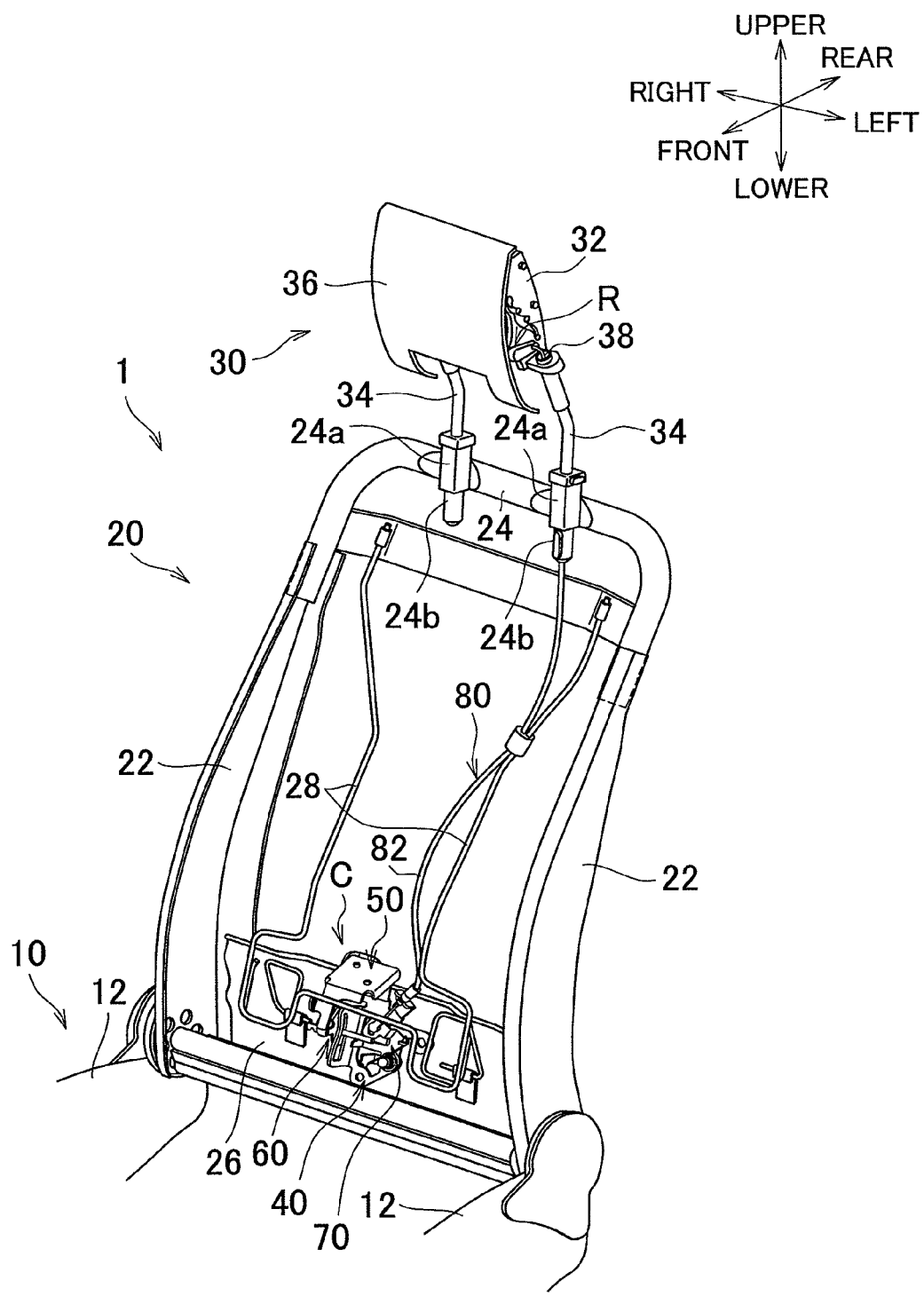
FIG. 1 is an overall schematic view of a vehicle seat to which a clutch mechanism for a vehicle seat is applied according to an embodiment of the invention.
Figure 2:
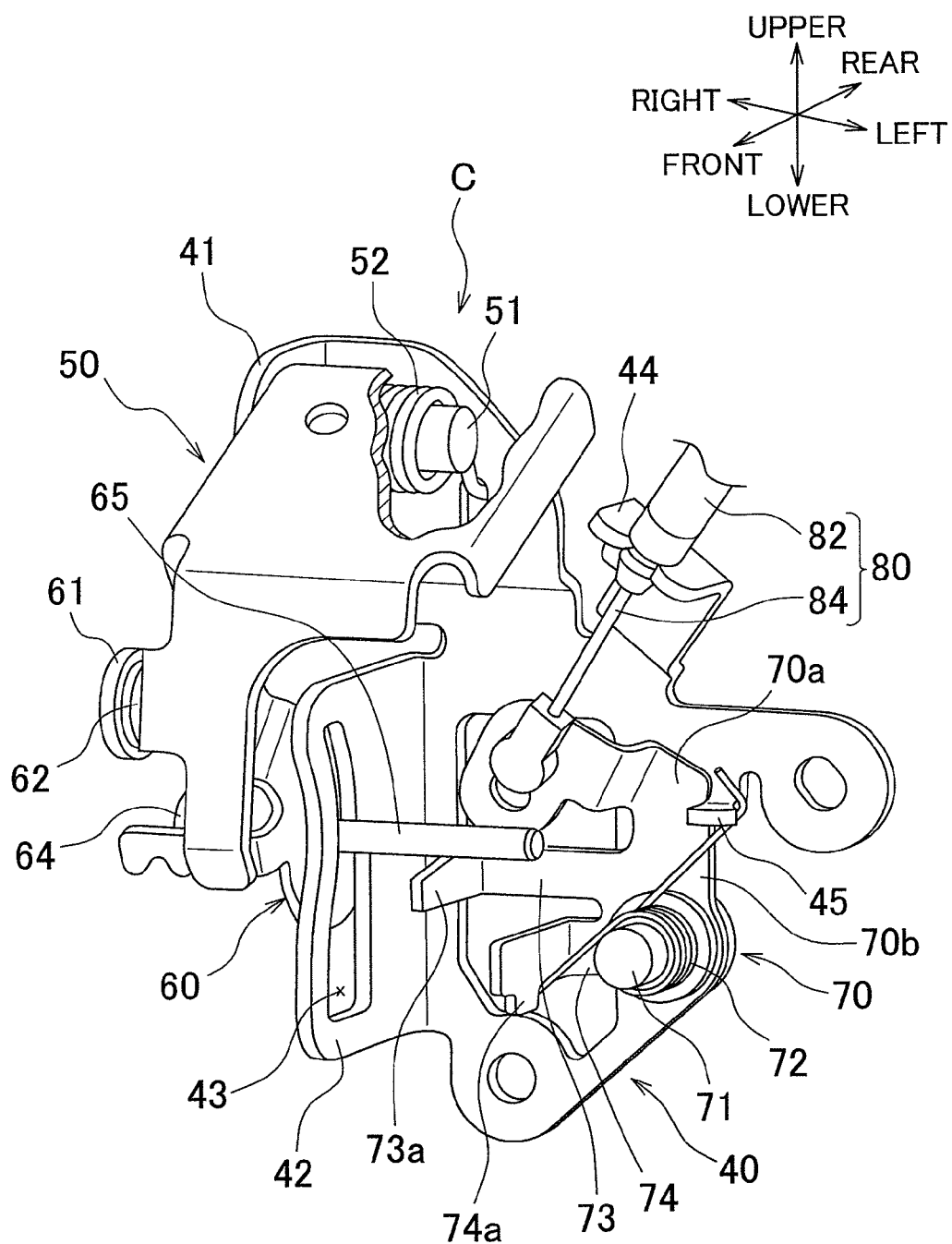
FIG. 2 is an enlarged view of the clutch mechanism for a vehicle seat shown in FIG. 1, showing a pressure-receiving member with a portion cut away.

Hereinafter, an embodiment of the invention will be described with reference to FIG. 1 to FIG. 16. FIG. 1 is an overall schematic view of a vehicle seat to which a clutch mechanism for a vehicle seat is applied according to the embodiment of the invention. FIG. 2 is an enlarged view of the clutch mechanism for a vehicle seat shown in FIG. 1, showing a pressure-receiving member with a portion cut away. FIG. 3 is a front schematic view of FIG. 2. FIG. 4 is a side schematic view of FIG. 2.

Figure 5:
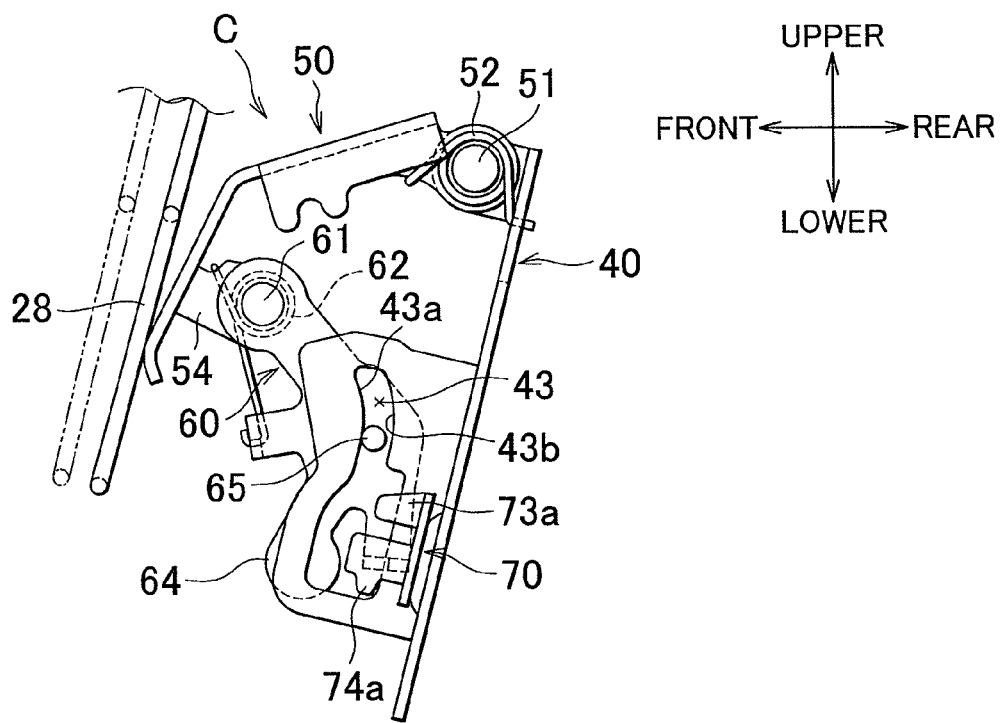
FIG. 5 is a schematic view that shows a state where an occupant's backrest load is applied by mere backrest motion of an occupant having a light weight from the state shown in FIG. 4.
Figure 6:
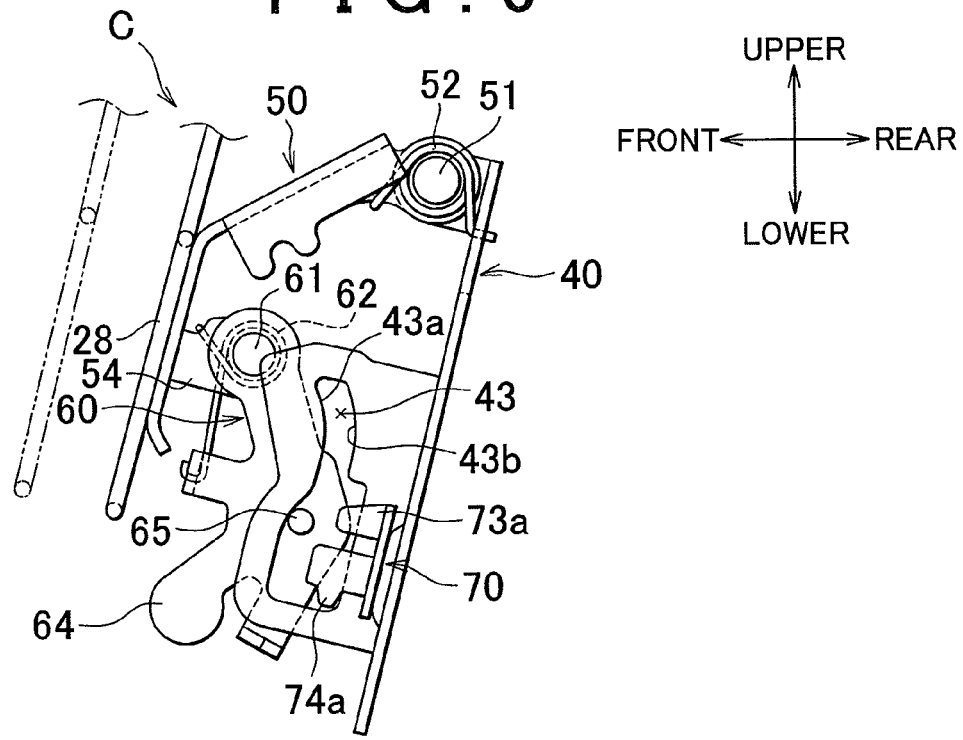
FIG. 6 is a schematic view that shows a state where an occupant's backrest load is strongly applied when the occupant gets on or off the vehicle from the state shown in FIG. 5.
Figure 7:
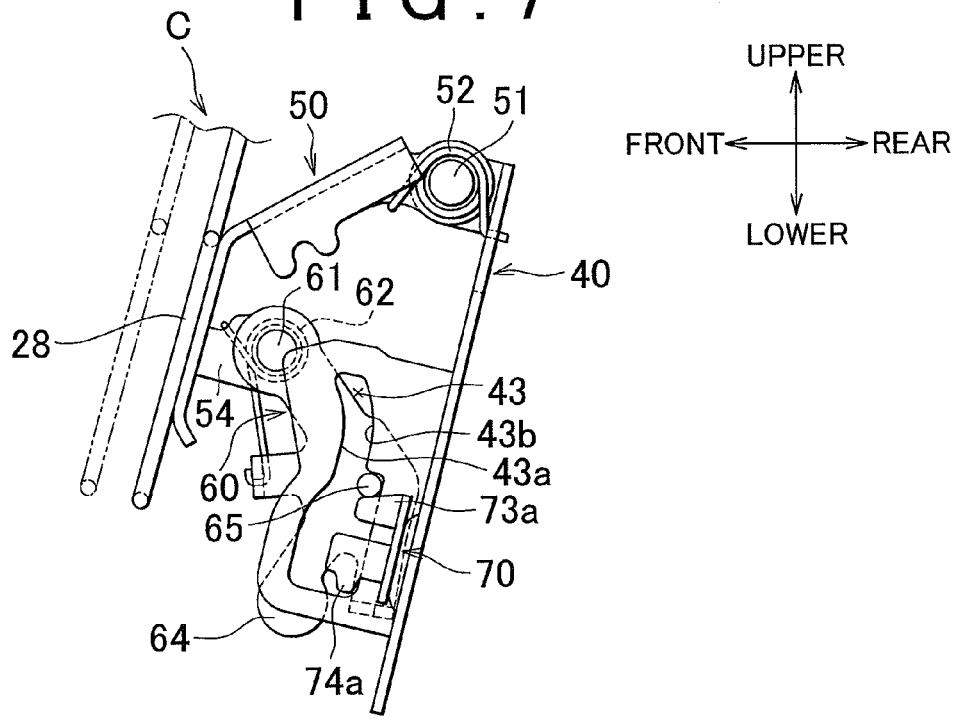
FIG. 7 is a schematic view that shows a state where an occupant's backrest load is strongly applied when a rear-end collision occurs in the vehicle from the state shown in FIG. 5.
Figure 8:
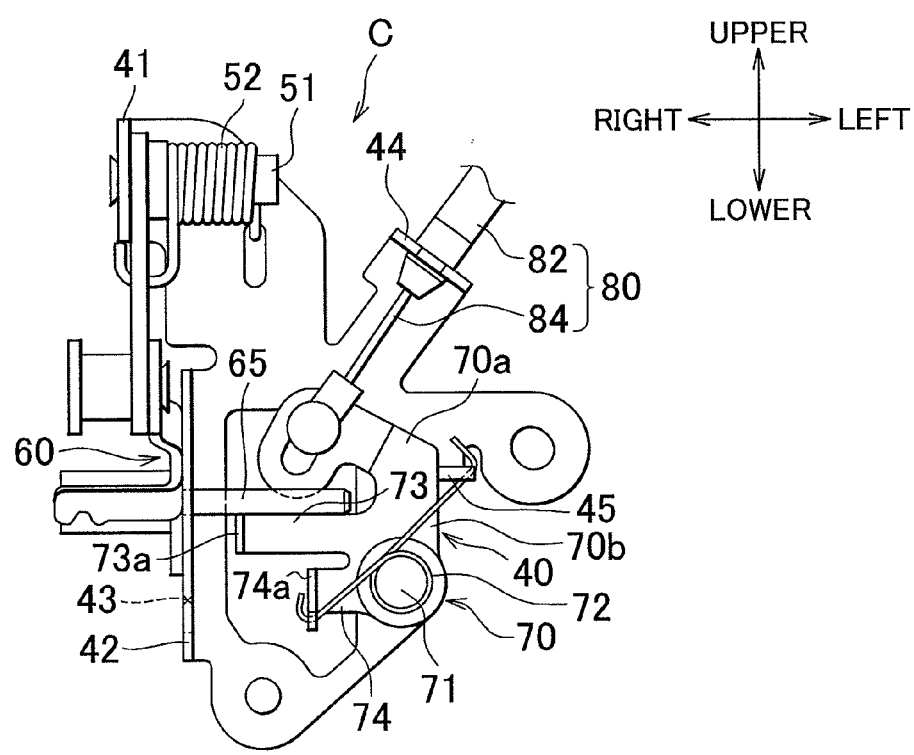
FIG. 8 is a front schematic view of FIG. 7
Figure 9:
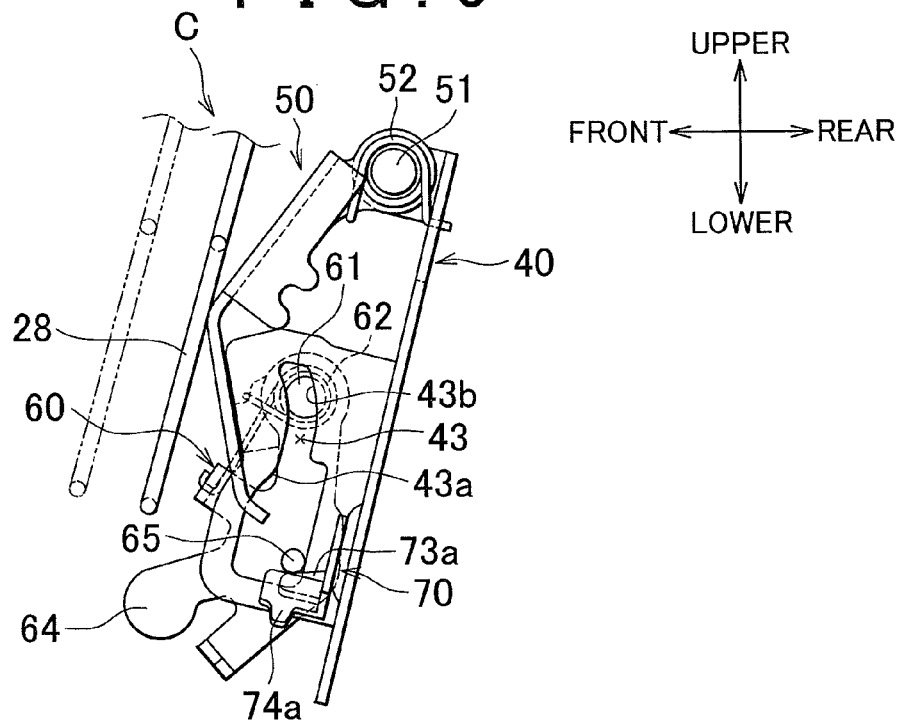
FIG. 9 is a schematic view that shows a state where a backrest load is strongly applied further from the state shown in FIG. 7.
Figure 10:
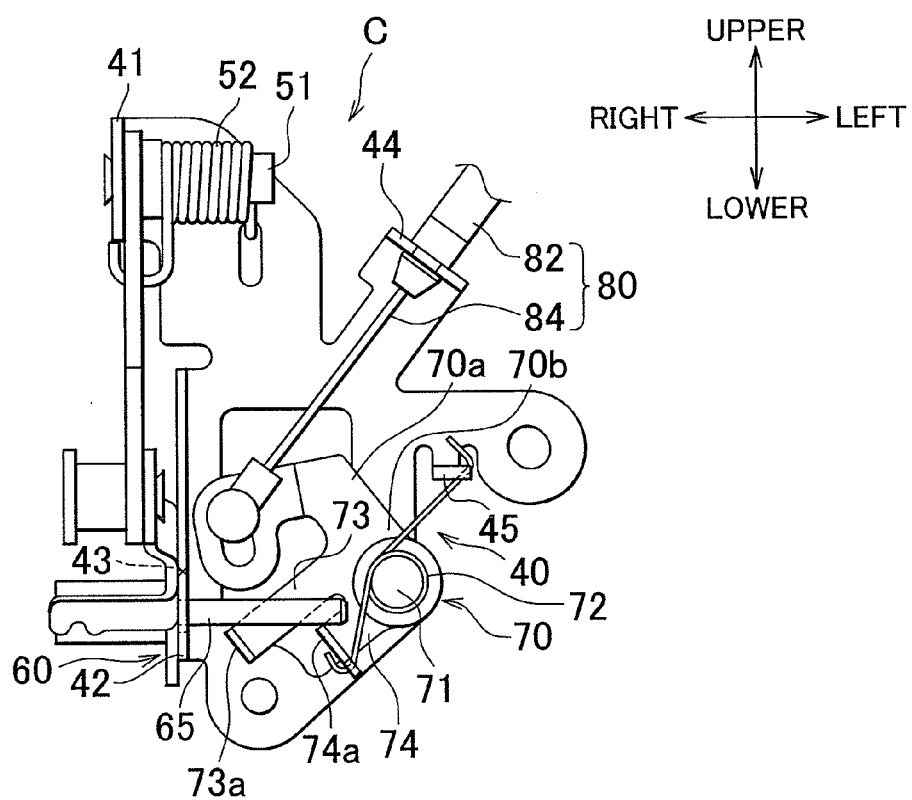
FIG. 10 is a front schematic view of FIG. 9.

FIG. 5 is a schematic view that shows a state where an occupant's backrest load is applied by mere backrest motion of an occupant having a light weight from the state shown in FIG. 4. FIG. 6 is a schematic view that shows a state where an occupant's backrest load is strongly applied when the occupant gets on or off the vehicle from the state shown in FIG. 5. FIG. 7 is a schematic view that shows a state where an occupant's backrest load is strongly applied when a rear-end collision occurs in the vehicle from the state shown in FIG. 5. FIG. 8 is a front schematic view of FIG. 7. FIG. 9 is a schematic view that shows a state where a backrest load is strongly applied further from the state shown in FIG. 7. FIG. 10 is a front schematic view of FIG. 9.

Figure 11:
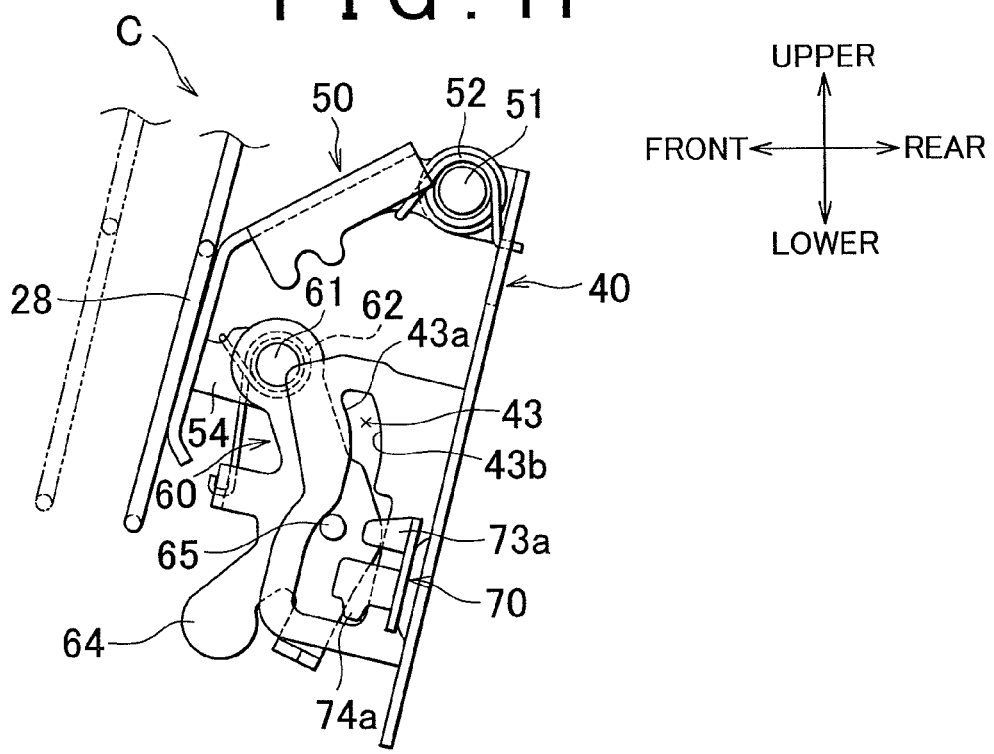
FIG. 11 is a schematic view that shows a state where an occupant's backrest load is applied by mere backrest motion of an occupant having a heavy weight from the state shown in FIG. 4.
Figure 12:
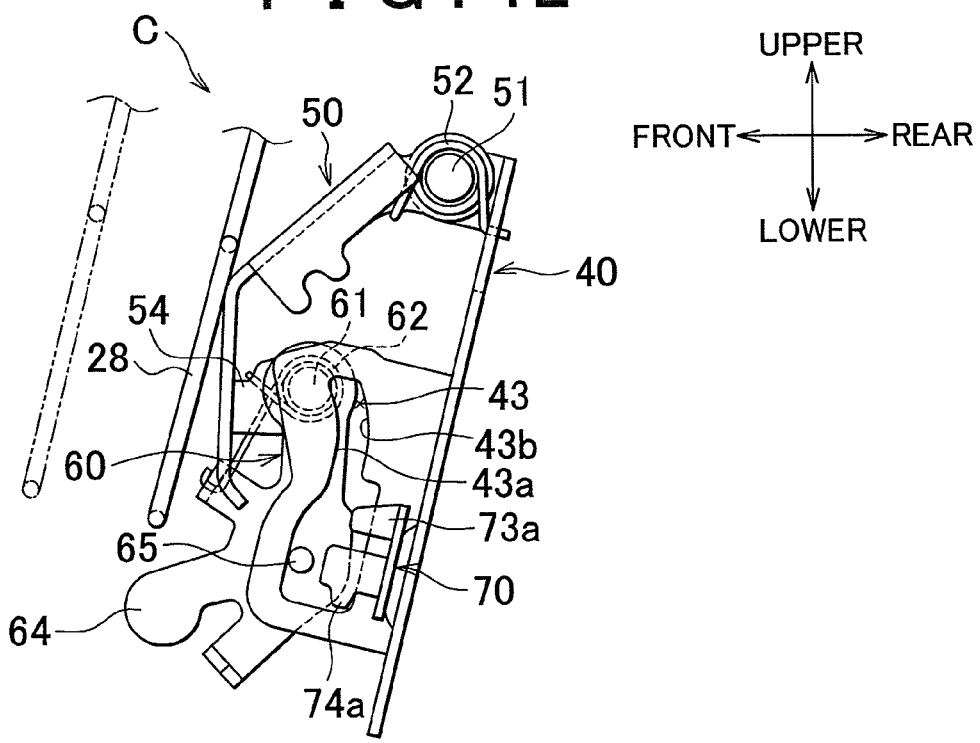
FIG. 12 is a schematic view that shows a state where an occupant's backrest load is strongly applied when the occupant gets on or off the vehicle from the state shown in FIG. 11.
Figure 13:
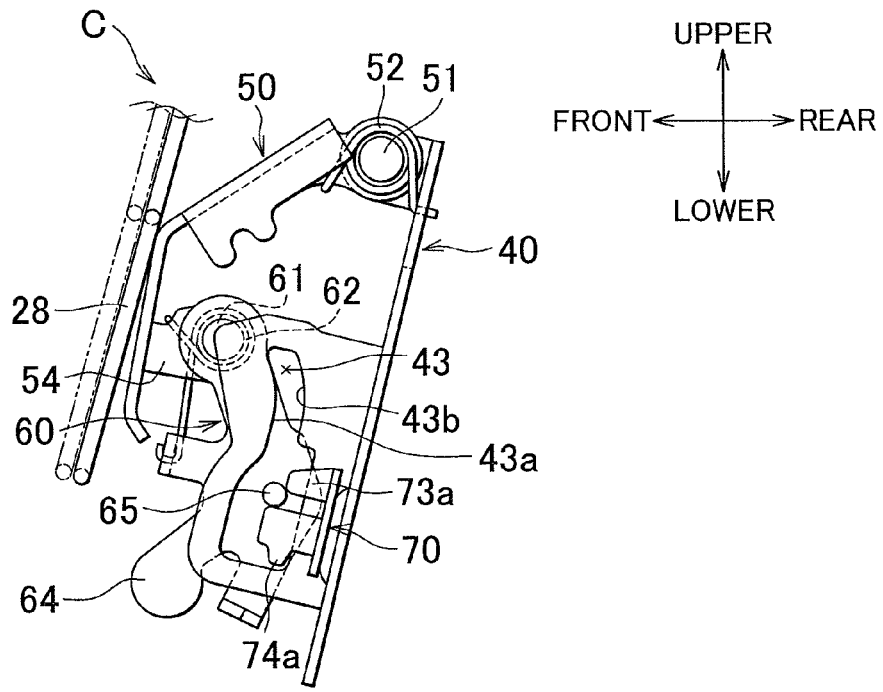
FIG. 13 is a schematic view that shows a state where an occupant's backrest load is strongly applied when a rear-end collision occurs in the vehicle from the state shown in FIG. 11.
Figure 14:
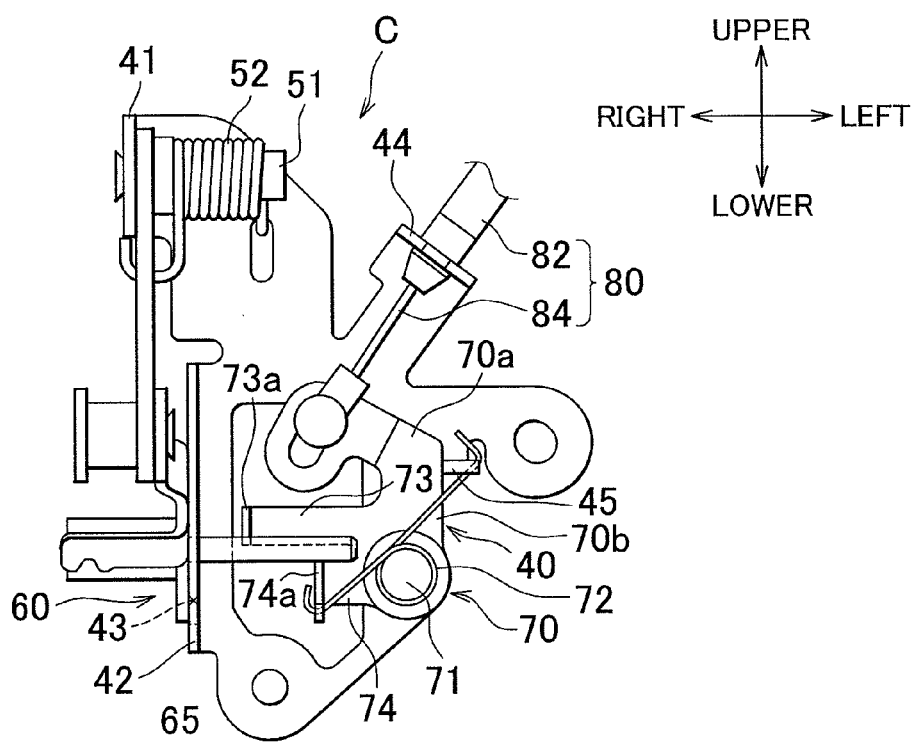
FIG. 14 is a front schematic view of FIG. 13.
Figure 15:
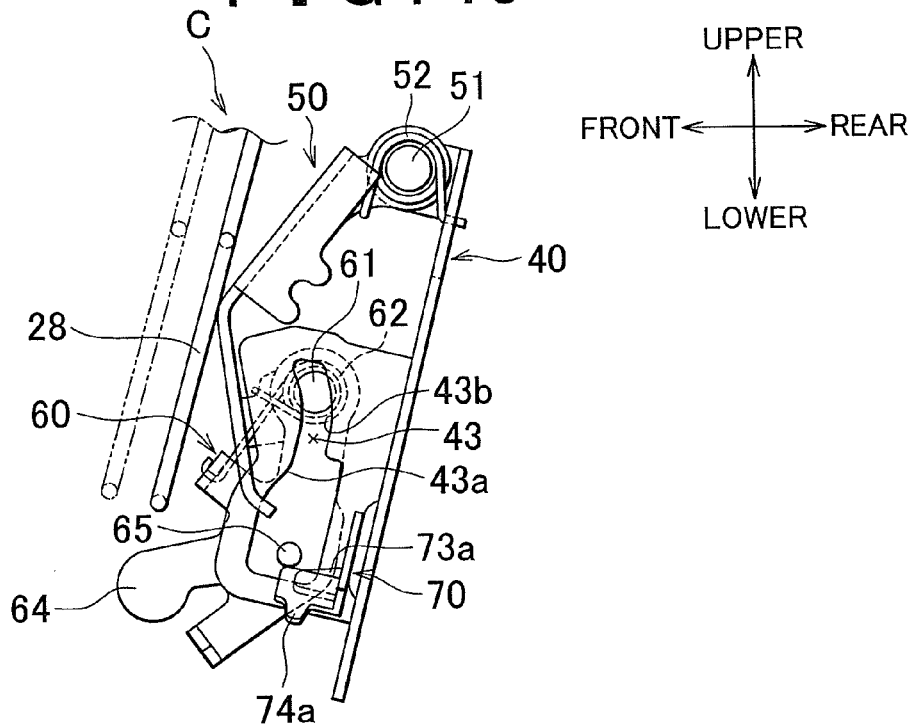
FIG. 15 is a schematic view that shows a state where a backrest load is strongly applied further from the state shown in FIG. 13.
Figure 16:
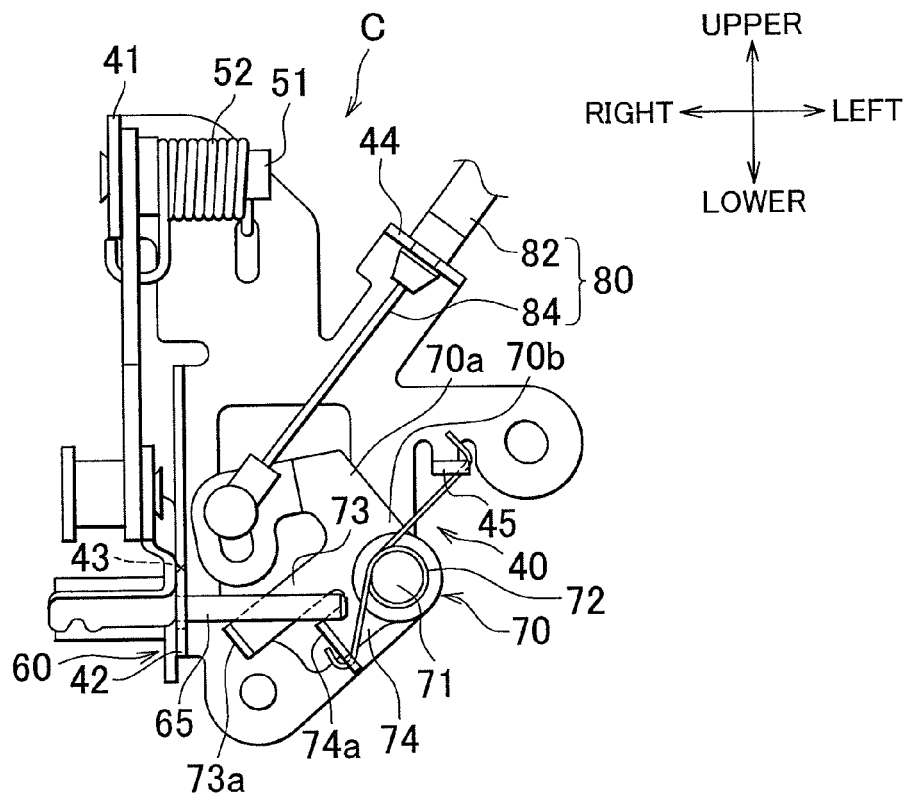
FIG. 16 is a front schematic view of FIG. 15.

FIG. 11 is a schematic view that shows a state where an occupant's backrest load is applied by mere backrest motion of an occupant having a heavy weight from the state shown in FIG. 4. FIG. 12 is a schematic view that shows a state where an occupant's backrest load is strongly applied when the occupant gets on or off the vehicle from the state shown in FIG. 11. FIG. 13 is a schematic view that shows a state where an occupant's backrest load is strongly applied when a rear-end collision occurs in the vehicle from the state shown in FIG. 11. FIG. 14 is a front schematic view of FIG. 13. FIG. 15 is a schematic view that shows a state where a backrest load is strongly applied further from the state shown in FIG. 13. FIG. 16 is a front schematic view of FIG. 15.

Note that, in order to clearly illustrate the internal structure of a vehicle seat 1 formed of a seat cushion 10, a seat back 20 and an active headrest 30, FIG. 1 omits the cushion structure and cover structure of these and shows the frame structure inside the vehicle seat 1 only. In addition, in the following description, upper, lower, front, rear, left and right respectively indicate the upper, lower, front, rear, left and right directions illustrated in the drawings, that is, the upper, lower, front, rear, left and right directions with reference to the vehicle seat 1.

First, the overall configuration of the vehicle seat 1 according to the embodiment of the invention will be described. As shown in FIG. 1 and FIG. 2, the vehicle seat 1 includes the seat cushion 10, the seat back 20 and the active headrest 30. An occupant is seated on the seat cushion 10. The seat back 20 serves as a backrest for the seated occupant. The active headrest 30 supports the back of the head of the seated occupant.

Among these components, the respective frame structures of the seat back 20 and active headrest 30 will be described in detail. Note that the seat cushion 10 has a known configuration, so the detailed description thereof is omitted. First, the frame structure of the seat back 20 will be described in detail. The frame of the seat back 20 includes a pair of left and right side frames 22, an upper frame 24 and a lower frame 26. The upper frame 24 bridges the upper portions of both side frames 22. The lower frame 26 bridges the lower portions of both side frames 22.

The lower ends of both side frames 22 are assembled respectively to the rear ends of a pair of left and right cushion frames 12 of the seat cushion 10 via reclining mechanisms (not shown). Thus, the seat back 20 may be tilted with respect to the seat cushion 10, and the seat back 20 may be held at a desired position within the range in which the seat back 20 may be tilted.

A pair of left and right holders 24a are assembled to the upper frame 24. Supports 24b are respectively assembled to both holders 24a. A pair of left and right stays 34 of the active headrest 30, which will be described later, may be inserted into and engaged with the supports 24b. By so doing, the active headrest 30 may be assembled to the seat back 20.

Note that a lock release member (not shown) for releasing a lock mechanism R of the active headrest 30, which will be described later, is provided inside one of the supports 24b (the left support 24b in FIG. 1). The lock release member is connected to a swing member 70, which will be described later, via an operation cable 80. The operation cable 80 is a double-structure cable member formed of a cylindrical outer cable 82 and a wire-shaped inner cable 84. The inner cable 84 is movably inserted in the outer cable 82.

Within the operation cable 80, one end (upper end) of the outer cable 82 is hooked on the left support 24b, while the other end (lower end) is hooked on a third rib 44 of a base plate 40, which will be described later. On the other hand, one end (upper end) of the inner cable 84 is hooked on the above described lock release member, while the other end (lower end) thereof is hooked on the swing member 70, as described above. Then, as the tension is applied to the inner cable 84, the lock release member moves a rod 38 inside the left stay 34 to release the lock mechanism R of the active headrest 30. Note that the operation cable 80 serves as a "transmitting member" according to the aspect of the invention. In this way, the frame of the seat back 20 is formed.

Next, the frame structure of the active headrest 30 will be described in detail. The frame of the active headrest 30 includes a base portion 32, a pair of left and right stays 34, and a support plate 36. The base portion 32 contours the active headrest 30. The pair of left and right stays 34 are integrally assembled to the base portion 32. The support plate 36 is assembled to the base portion 32 via an extension spring and a link mechanism (both are not shown in the drawing).

Note that, during normal times before a rear-end collision occurs in the vehicle, the support plate 36 is locked by the kick mechanism R so as to be substantially integrated with the base portion 32 against the urging force of the extension spring.

Therefore, as the above described lock mechanism R is released, the link mechanism is activated by the urging force of the extension spring to cause the support plate 36 to instantaneously pop up forward with respect to the base portion 32. By so doing, it is possible to instantaneously support the back of the head of the occupant by the support plate 36. In this way, the frame of the active headrest 30 is formed.

Next, a clutch mechanism C assembled to the above described vehicle seat 1 will be described. As shown in FIG. 2 to FIG. 4, the clutch mechanism C includes the base plate 40, a pressure receiving member 50, a coupling arm 60, the swing member 70. Hereinafter, these components 40, 50, 60, and 70 will be separately described.

First, the base plate 40 will be described. The base plate 40 is a plate that serves as a base of the clutch mechanism C. The base plate 40 is fastened to the front face of the lower frame 26.

Next, the pressure receiving member 50 will be described. The pressure receiving member 50 is a plate that receives a backrest load of the occupant seated on the vehicle seat 1. The pressure receiving member 50 is assembled to a first rib 41 via a pin 51 so that the pressure receiving member 50 is pivotable about an axis of which the direction coincides with a vehicle width direction. The first rib 41 is formed on the base plate 40. At this time, the pressure receiving member 50 is assembled so that the distal end of the pressure receiving member 50 is urged via a torsion spring 52 in a direction (arrow A direction in FIG. 4) to contact a bending spring 28 that supports a pad (not shown).

Next, the coupling arm 60 will be described. The coupling arm 60 is formed into a substantially dogleg shape. The coupling arm 60 transmits only an occupant's backrest load, caused by a rear-end collision of the vehicle, to the swing member 70, which will be described later. A pin 65 is formed at a bent portion of a substantially dogleg shape of the coupling arm 60. The pin 65 is movable inside an oblong hole 43 formed in a second rib 42 of the base plate 40. In addition, a weight 64 is assembled to the distal end of the coupling arm 60.

A rib 54 is formed on the pressure receiving member 50. Then, the coupling arm 60 is assembled to the rib 54 via a pin also that the proximal end of the coupling arm 60 is pivotable about an axis of which the direction coincides with the vehicle width direction. At this time, the coupling arm 60 is assembled so that the pin 65 thereof is urged via a torsion spring 62 in a direction (arrow B direction in FIG. 4) to contact a front face 43*a* of the oblong hole 43.

Subsequently, the swing member 70 will be described. The swing member 70 is a flat member with portions bent substantially at a right angle. The swing member 70 pulls the operation cable 80 using a backrest load from the above described coupling arm 60. The swing member 70 is assembled to the base plate 40 via a pin 71 so that the first member 70 is pivotable about an axis of which the direction coincides with a direction perpendicular to the surface of the base plate 40. At this time, the swing member 70 is assembled so that a protruding portion 70*a* is urged via a torsion spring 72 in a direction (arrow C direction in FIG. 3) to contact a fourth rib 45. The protruding portion 70*a* is formed to protrude from part of a main body 70*b* of the first swing member 70. The fourth rib 45 is formed on the base plate 40.

In addition, a first arm 73 and a second arm 74 are formed on the main body 70*b* of the first swing member 70. The first arm 73 and the second arm 74 protrude from part of the main body 70*b* of the first swing member 70. Hooks 73*a* and 74*a* are respectively formed at the distal ends of these arms 73 and 74. Between these hooks 73*a* and 74*a*, the former hook 73*a* is formed so that the pin 65 of the coupling arm 60 is pressed against the hook 73*a* by a small backrest load, while the latter hook 74*a* is formed so that the pin 65 of the coupling arm 60 is pressed against the hook 74*a* by a large backrest load.

Then, these arms 73 and 74 are set so that the pivot amount of the swing member 70 is constant even when the pin 65 of the coupling arm 60 is pressed against any one of the hooks 73*a* and 74*a* to cause the swing member 70 to pivot. That is, these arms 73 and 74 are set so that a position at which the swing member 70 completes the pivot coincides with each other even when the pin 65 of the coupling arm 60 presses the hook 73*a* of the first arm 73 to pivot the swing member 70 or even when the pin 65 of the coupling arm 60 presses the hook 74*a* of the second arm 74 to pivot the swing member 70.

Note that the length of the first arm 73 is set at a length such that the pin 65 of the coupling arm 60 presses the first arm 73 to apply sufficient tension to the inner cable 84. This also applies to the second arm 74. In addition, as described above, the other end (lower end) of the inner cable 84 of the operation cable 80 is hooked on the swing member 70. In this way, the clutch mechanism C is formed.

Next, the operation of the above described clutch mechanism C will be described with reference to FIG. 4 to FIG. 16. The description will be made separately on a case where a light occupant is seated on the vehicle seat 1 (where a small backrest load is applied) and on a case where a heavy occupant is seated on the vehicle seat 1 (where a large backrest load is applied).

First, the case where a light occupant is seated on the vehicle seat 1 will be described. As the occupant merely rests on the seat back 20 from the state shown in FIG. 4 and then the pressure receiving member 50 receives a backrest load from the occupant, the pin 65 of the coupling arm 60 moves downward inside the oblong hole 43. At this time, the pin 65 of the coupling arm 60 moves along the front face 43*a* of the oblong hole 43 by the urging force of the torsion spring 62 applied to the coupling arm 60 (see FIG. 5).

In addition, as the occupant gets off the vehicle and then the pressure receiving member 50 further receives a backrest load from the occupant from the state shown in FIG. 5, the pin 65 of the coupling arm 60 moves further downward inside the oblong hole 43. At this time as well, the pin 65 of the coupling arm 60 moves along the front face 43*a* of the oblong hole 43 by the urging force of the torsion spring 62 applied to the coupling arm 60 (see FIG. 6). Therefore, neither the backrest load caused by the occupant merely resting nor the backrest load caused by the occupant getting off the vehicle is transmitted to the swing member 70. Note that this also applies to a backrest load caused by the occupant getting on the vehicle.

Subsequently, as a rear-end collision occurs in the vehicle from the state shown in FIG. 5 and then the pressure receiving member 50 further receives a backrest load from the occupant, the pin 65 of the coupling arm 60 moves downward inside the oblong hole 43. At this time, inertial force is applied to the weight 64 of the coupling arm 60 rearward because of the rear-end collision of the vehicle, so the pin 65 of the coupling arm 60 moves along a rear face 43*b* inside the oblong hole 43 against the urging force of the torsion spring 62 applied to the coupling arm 60 (see FIGS. 7 and 8).

Then, as the pressure receiving member 50 further receives a backrest load from the occupant in accordance with an impact of the rear-end collision, the pin 65 of the coupling arm 60 moves while pressing the hook 73*a* of the first arm 73 of the swing member 70. This movement of the pin 65 causes the pin 65 of the coupling arm 60 to progressively pivot the swing member 70 against the urging force of the torsion spring 72. Thus, the backrest load caused by the rear-end collision of the vehicle is transmitted to the swing member 70 (see FIG. 9 and FIG. 10).

At this time, the inner cable 84 of the operation cable 80 is pulled, and the tension is applied to the pulled inner cable 84. Therefore, as described above, the lock mechanism R is released to cause the support plate 36 to pop up toward the back of the head of the occupant. In this way, even when the light occupant is seated on the vehicle seat 1, it is possible to cause the active headrest 30 to pop up toward the back of the head of the occupant.

Subsequently, the case where the heavy occupant is seated on the vehicle seat 1 will be described. As the occupant merely rests on the seat back 20 from the state shown in FIG. 4 and then the pressure receiving member 50 receives a backrest load from the occupant, the pin 65 of the coupling arm 60 moves downward inside the oblong hole 43, as in the case of the description as to when the light occupant is seated on the vehicle seat 1. At this time, the pin 65 of the coupling arm 60 moves along the front face 43a of the oblong hole 43 by the urging force of the torsion spring 62 applied to the coupling arm 60 (see FIG. 11).

In addition, as the occupant gets off the vehicle and then the pressure receiving member 50 further receives a backrest load from the occupant from the state shown in FIG. 11, the pin 65 of the coupling arm 60 moves further downward inside the oblong hole 43. At this time as well, the pin 65 of the coupling arm 60 moves along the front face 43a of the oblong hole 43 by the urging force of the torsion spring 62 applied to the coupling arm 60 (see FIG. 12). Therefore, neither the backrest load caused by the occupant merely resting nor the backrest load caused by the occupant getting off the vehicle is transmitted to the swing member 70. Note that this also applies to a backrest load caused by the occupant getting on the vehicle.

Subsequently, as a rear-end collision occurs in the vehicle from the state shown in FIG. 11 and then the pressure receiving member 50 further receives a backrest load from the occupant, the pin 65 of the coupling arm 60 moves downward inside the oblong hole 43, as in the case of the description as to when the light occupant is seated on the vehicle seat 1. At this time, inertial force is applied to the weight 64 of the coupling arm 60 rearward because of the rear-end collision of the vehicle, so the pin 65 of the coupling arm 60 moves along a rear face 43b inside the oblong hole 43 against the urging force of the torsion spring 62 applied to the coupling arm 60 (see FIGS. 13 and 14).

Then, as the pressure receiving member 50 further receives a backrest load from the occupant in accordance with an impact of the rear-end collision, the pin 65 of the coupling arm 60 moves while pressing the hook 74a of the second arm 74 of the swing member 70, as in the case of the description as to when the light occupant is seated on the vehicle seat 1. This movement of the pin 65 causes the pin 65 of the coupling arm 60 to progressively pivot the swing member 70 against the urging force of the torsion spring 72. Thus, the backrest load caused by the rear-end collision of the vehicle is transmitted to the swing member 70 (see FIG. 15 and FIG. 16).

At this time, as in the case of the description as to when the light occupant is seated on the vehicle seat 1, the inner cable 84 of the operation cable 80 is pulled, and the tension is applied to the pulled inner cable 84. Therefore, as described above, the lock mechanism R is released to cause the support plate 36 to pop up toward the back of the head of the occupant. In this way, even when the heavy occupant is seated on the vehicle seat 1, it is possible to cause the active headrest 30 to pop up toward the back of the head of the occupant.

The clutch mechanism C for a vehicle seat according to the embodiment of the invention is configured as described above. With the above configuration, even when a light occupant is seated on the vehicle seat 1 or even when a heavy occupant is seated on the vehicle seat 1, it is possible to transmit only an occupant's backrest load, caused by a rear-end collision of the vehicle, to the swing member 70. Therefore, even when there is a physique difference among occupants, it is possible to reliably transmit only an occupant's backrest load, caused by a rear-end collision of the vehicle, to the swing member 70. In addition, with the above configuration, even when a light occupant is seated on the vehicle seat 1 or even when a heavy occupant is seated on the vehicle seat 1, it is possible to equalize the pivot amount of the swing member 70 when an occupant's backrest load is transmitted to the swing member 70. Therefore, when the tension is, for example, applied to the operation cable 80 by an occupant's backrest load caused by a rear-end collision of the vehicle, it is possible to prevent an excessive magnitude of tension from being applied to the operation cable 80 even when the occupant's backrest load is large.

In addition, with the above configuration, the tension is applied to the operation cable 80 by the backrest load transmitted to the swing member 70, thus releasing the lock mechanism R. Therefore, it is possible to release the lock mechanism R using the pivot of the swing member 70.

In addition, with the above configuration, it is possible to cause the support plate 36 to pop up toward the back of the head of an occupant by an occupant's backrest load caused by a rear-end collision of the vehicle. Thus, as a rear-end collision occurs in the vehicle, it is possible to instantaneously receive the back of the head of the occupant by the support plate 36.

The above described content only relates to one embodiment of the invention, and is not intended to limit the invention. In addition, in the above embodiment, the first arm 73 corresponding to a small backrest load and the second arm 74 corresponding to a large backrest load are described as an example of a plurality of arms that are formed to be able to operate on the basis of the magnitude of an occupant's backrest load. However, the aspect of the invention is not limited to this configuration. A third arm corresponding to an intermediate backrest load may be further provided.

What is claimed is:

1. A clutch mechanism for a vehicle seat comprising:
   a pressure receiving member that is pivotably connected to a frame of a seat back;
   a coupling arm that is pivotably connected to the pressure receiving member, wherein the coupling arm is provided with a weight and receives an occupant's backrest load via the pressure receiving member, and the occupant's backrest load received and inertia force applied to the weight in the event of a rear-end collision of the vehicle cause the coupling arm to move in the event of a rear-end collision of a vehicle; and
   a swing member that is pivotably connected to the frame of the seat back and that is pressed by the coupling arm to pivot, wherein
   the swing member has a first arm receiving a first backrest load via the coupling arm and a second arm receiving a second backrest load, which is larger than the first backrest load, via the coupling arm,
   the first and second arms are set so that a maximum pivot amount of the swing member when the first arm is pressed to pivot is equal to a maximum pivot amount of the swing member when the second arm is pressed to pivot.

2. The clutch mechanism for a vehicle seat according to claim 1, wherein
a position to which the swing member is pivoted when the coupling arm presses the first arm to a limit in the event of a rear-end collision of the vehicle is the same as a position to which the swing member is pivoted when the coupling arm presses the second arm to a limit in the event of a rear-end collision of the vehicle.

3. The clutch mechanism for a vehicle seat according to claim 1, wherein
the coupling arm is provided with a rod that extends toward the swing member, and
when the pressure receiving member pivots, the rod presses a first hook formed on the first arm or a second hook formed on the second arm to swing the swing member, whereby an occupant's backrest load is transmitted to the swing member.

4. The clutch mechanism for a vehicle seat according to claim 3, further comprising:
a guide plate that has a guide hole along which the rod moves substantially downward when the pressure receiving member receives the occupant's backrest load, wherein
the rod extends from the coupling arm in a seat width direction of the vehicle seat,
the first arm extends from the swing member toward the coupling arm in the seat width direction and has the first hook at its distal end, wherein the first hook extends toward a front of the vehicle seat,
the second arm extends from the swing member toward the coupling arm in the seat width direction and has the second hook at its distal end, wherein the second hook extends toward the front of the vehicle seat,
the first arm is provided above the second arm, and
when the rod presses the first arm or the second arm and moves to a lower end of the guide hole, the lower end of the rod, an upper end of the first hook and an upper end of the second hook are located at the same level.

5. The clutch mechanism for a vehicle seat according to claim 1, further comprising:
a lock mechanism that is provided for the seat back and that is connected to the swing member via a transmitting member, wherein
the lock mechanism is released as the swing member pivots.

6. The clutch mechanism for a vehicle seat according to claim 5, further comprising:
an active headrest that is assembled to the seat back and that has a support plate that pops up toward the back of a head of the occupant, wherein
the support plate pops up toward the back of the head of the occupant as the lock mechanism is released.

* * * * *